US012803300B2

(12) United States Patent
Zheng et al.

(10) Patent No.: US 12,803,300 B2
(45) Date of Patent: Nov. 17, 2026

(54) DRIVING CIRCUIT OF SWITCH ARRAY AND CONTROL CIRCUIT

(71) Applicant: Silergy Semiconductor Technology (Hangzhou) LTD, Hangzhou (CN)

(72) Inventors: Jialu Zheng, Hangzhou (CN); Ji Ma, Hangzhou (CN); Yunlong Han, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 862 days.

(21) Appl. No.: 18/123,470

(22) Filed: Mar. 20, 2023

(65) Prior Publication Data

US 2023/0318318 A1 Oct. 5, 2023

(30) Foreign Application Priority Data

Apr. 1, 2022 (CN) ......................... 202210348582.7

(51) Int. Cl.
*H02J 7/00* (2026.01)
*H02J 7/56* (2026.01)
*H02M 3/02* (2006.01)

(52) U.S. Cl.
CPC ................. *H02J 7/56* (2026.01); *H02M 3/02* (2013.01)

(58) Field of Classification Search
None
See application file for complete search history.

(56) References Cited

U.S. PATENT DOCUMENTS 6,703,762 B1 3/2004 Okada
2008/0278969 A1* 11/2008 Bolz ..................... H02J 7/0018 363/17
2010/0141188 A1* 6/2010 Kakebayashi ............ H02P 3/18 318/400.3
2012/0025769 A1* 2/2012 Kikuchi .................. B60L 58/14 320/118
2021/0242689 A1* 8/2021 Fukuchi ................ H02J 7/0014

FOREIGN PATENT DOCUMENTS

CN 202867012 U 4/2013
CN 110752635 A 2/2020
CN 112968611 A 6/2021

* cited by examiner

*Primary Examiner* — Arun C Williams

(57) ABSTRACT

A driving circuit of a switch array for controlling one of a plurality of battery modules coupled in series, where: each battery module comprises a plurality of batteries coupled in series; the driving circuit is configured to generate corresponding driving signals to control corresponding switches in the switch array, such that one battery that is selected to be balanced, is coupled between positive and negative poles of a DC bus voltage; and a reference ground of the driving circuit is configured as the negative pole of the DC bus voltage.

18 Claims, 8 Drawing Sheets

DRIVING CIRCUIT OF SWITCH ARRAY AND CONTROL CIRCUIT

RELATED APPLICATIONS

This application claims the benefit of Chinese Patent Application No. 202210348582.7, filed on Apr. 1, 2022, which is incorporated herein by reference in its entirety.

FIELD OF THE INVENTION

The present invention generally relates to the field of power electronics, and more particularly to driving circuits of a switch array and a control circuit.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention. With the development of economy, batteries have become one of the important clean energy sources in today's society. In general application, each battery pack consists of a plurality of battery modules connected in series, and each battery module consists of a plurality of battery cells or batteries connected in series.

Figure 1:
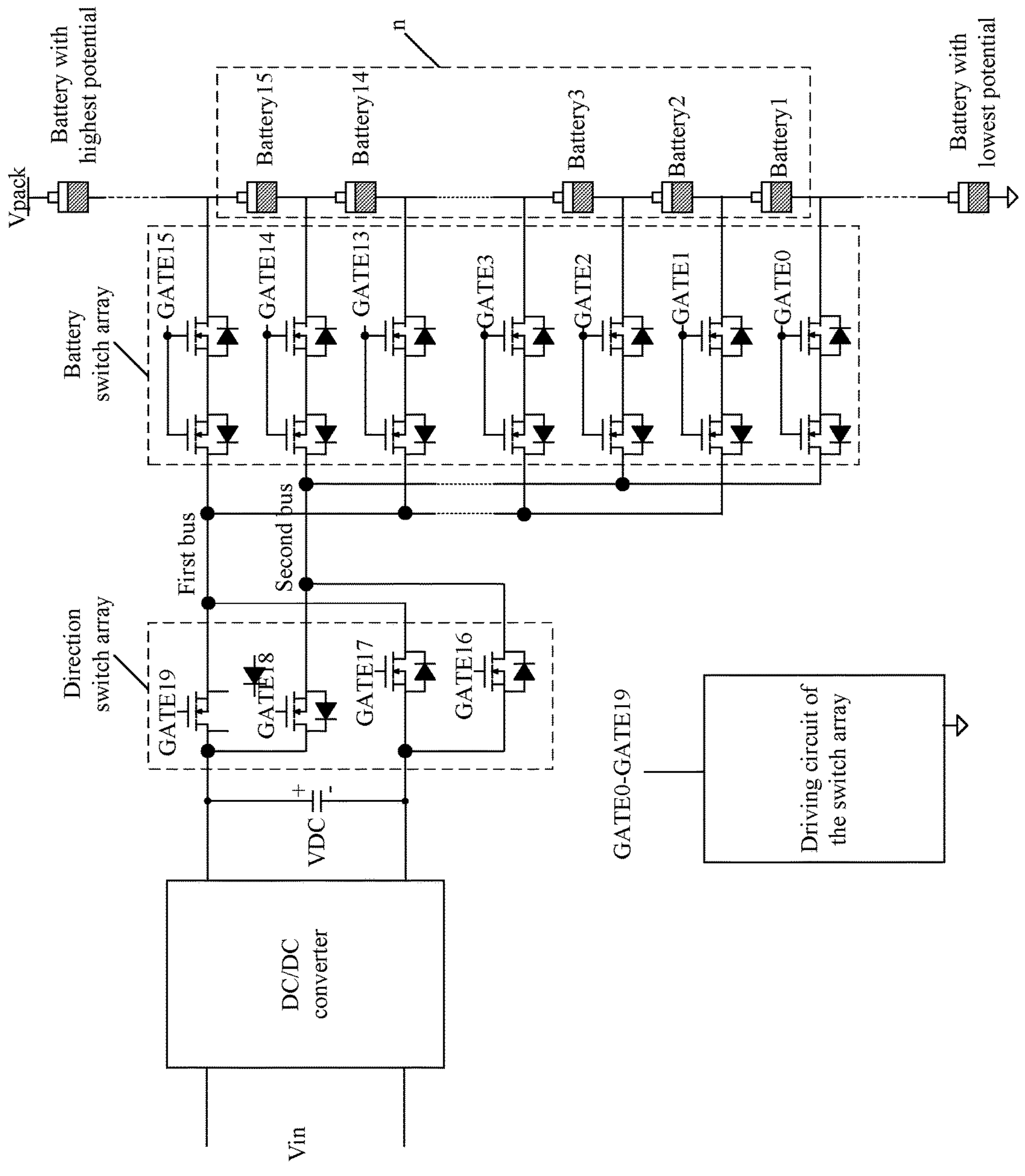
FIG. 1 is a schematic block diagram of an example control circuit of a battery module.

Referring now to FIG. 1, shown is a schematic block diagram of an example control circuit of a battery module. Taking the control circuit of module n as an example, module n can include 15 batteries, the control circuit can include a switch array, a driving circuit of the switch array, and a DC/DC converter. The switch array is divided into two stages: the switch array of this stage which selectively connects the batteries 1-15 between the first and second buses may be referred to as "battery switch array," and the switch array of this stage which connects the first and second buses to the secondary side of the DC/DC converter may be referred to as "direction switch array."

The DC/DC converter can balance the voltages of the batteries, and is usually an isolated converter including a transformer. When the DC/DC converter charges or discharges a battery, the driving circuit of the switch array may need to turn on the battery switch group and the direction switch corresponding to the battery, such that the anode of the battery can connect to the positive output terminal of the secondary side of the DC/DC converter, and the cathode of the battery can connect to the negative output terminal of the secondary side of the converter, thus forming a correct charging and discharging loop. For the driving circuit of the switch array, the current-source-based floating-ground drive scheme can mainly be adopted.

Figure 2:
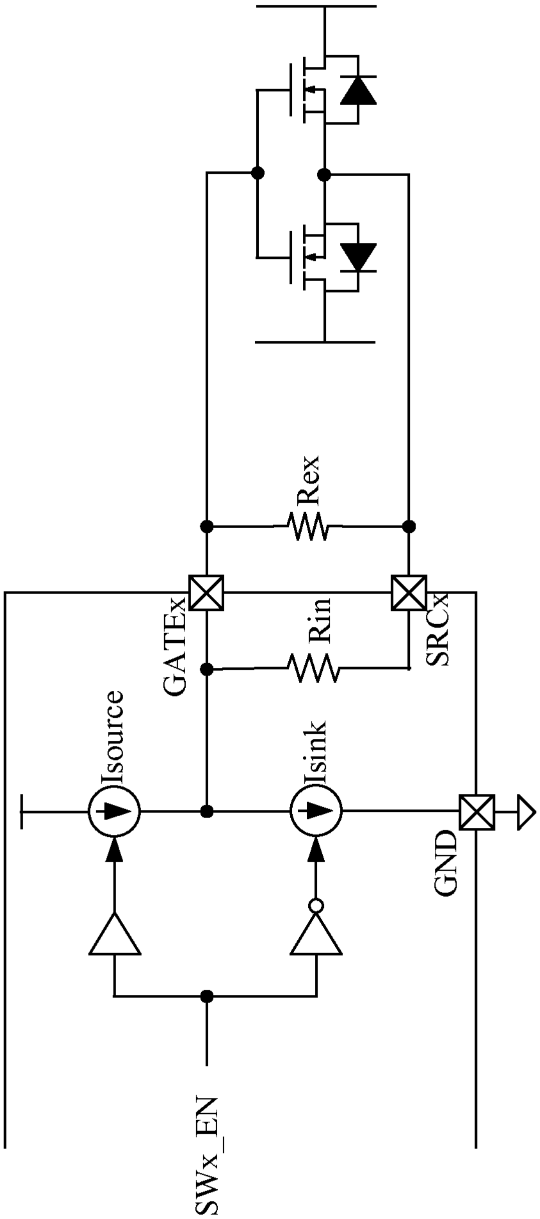
FIG. 2 is a schematic block diagram of an example sub-driving circuit of a battery switch group.

Referring now to FIG. 2, shown is a schematic block diagram of an example sub-driving circuit of a battery switch group. In this driving scheme, each battery switch group corresponds to a sub-driving circuit. When a battery switch group needs to be turned on, enable signal SWx_EN is set to a high level, and current source Isource in the sub-driving circuit starts to operate, thus charging the gate-source capacitor of each battery switch in the battery switch group, and forming a voltage drop on resistors Rin and Rex. When the voltage across the gate-source capacitor is greater than the conduction threshold of the battery switch during the charging phase, the battery switch group can be turned on. When the battery switch group needs to be turned off, the enable signal SWx_EN is set to a low level, current source Isource in the sub-driving circuit may stop operating, and current source Isink may start to operate, thus discharging the gate-source capacitor of each battery switch in the battery switch group. When the voltage across the gate-source capacitor is less than the conduction threshold of the battery switch during the discharging phase, the battery switch group can be turned off.

In this scheme, the reference ground of the sub-driving circuit of each battery switch group is the cathode of the battery with the lowest potential in the battery module with the lowest potential. When the battery with higher potential and higher common-mode voltage needs to be driven on, the pins GATEx and SRCx may need to be charged to a very high common-mode voltage, which can require a higher withstand voltage design during chip integration. In addition, two pins GATEx and SRCx for driving each battery switch group may be needed in this scheme, and as such it may soon a relatively high number of pin resources when designing the chip.

Figure 3:
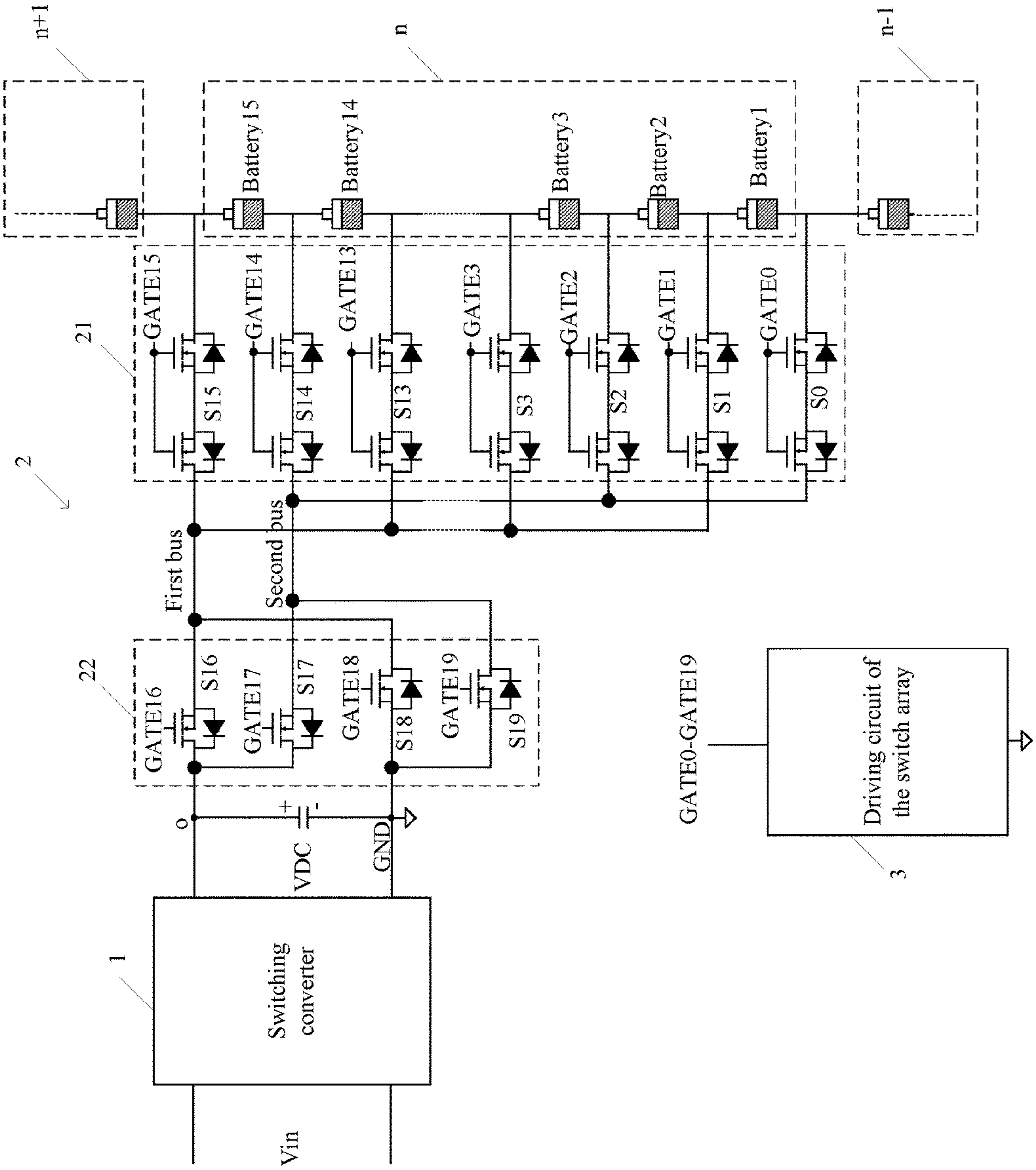
FIG. 3 is a schematic block diagram of an example control circuit of a battery module, in accordance with embodiments of the present invention.

Referring now to FIG. 3, shown is a schematic block diagram of an example control circuit of a battery module, in accordance with embodiments of the present invention. In this particular example, the control circuit of battery module n can include switching converter 1, switch array 2, and driving circuit 3 of the switch array. Switching converter 1 can perform power conversion on input voltage Vin and output DC bus voltage VDC, and the batteries in battery module n may be charged and discharged through switch array 2 to realize balanced control. In one embodiment, switching converter 1 can be configured as an isolated DC/DC converter, filter capacitor Co can connect between the positive and negative output terminals of the secondary side of switching converter 1, and the negative output terminal of switching converter 1 (e.g., the negative electrode of filter capacitor Co) can connect to reference ground GND, and the positive output terminal of switching converter 1 is o. The voltage across filter capacitor Co can be configured as DC bus voltage VDC.

Switch array 2 can be coupled with the batteries in battery module n, in order to respectively connect the anode and cathode of the battery to be balanced in battery module n to the positive and negative poles of the DC bus voltage. Switch array 2 can include battery switch array 21 and direction switch array 22. Battery switch array 21 can include a plurality of battery switch groups for selectively connecting the batteries in battery module n between the first bus and the second bus. For example, the anode and cathode of each battery may respectively be connected to the first bus and the second bus through a corresponding battery switch group, so the number of the battery switch groups is N+1, where N is the number of batteries in battery module n. In this embodiment, taking N=15 as an example, it should be understood that the number of batteries in the battery module can be determined according to the actual application.

In FIG. 3, the cathode of battery 1 can connect to the second bus through battery switch group S0, and the anode of battery 1 can connect to the first bus through battery switch group S1. The cathode of battery 2 can connect to the first bus through battery switch group S1, and the anode of battery 2 can connect to the second bus through battery switch group S2, and so on. The cathode of battery 15 can connect to the second bus through battery switch group S14, and the anode of battery 15 can connect to the first bus through battery switch group S15. In particular embodiments, each battery switch group can block the bidirectional flow of the current when being turned off, so each battery switch group can include two back-to-back battery switches, where the first power ends of the two battery switches can connect together, the control ends of the two battery switches can connect together, and the second power ends of the two battery switches may respectively be connected with the first or second bus and the corresponding battery.

In this embodiment, the two battery switches are N-type MOSFET with common source and common gate, and the two power ends of each battery switch can connect with two ends of the anti-parallel diode which can be equivalent to an anti-parallel diode inside the battery switch or a diode connected in anti-parallel outside the battery switch. As the batteries can connect in series, the anode of the battery with odd number can connect to the first bus through the corresponding battery switch group, and the cathode of the battery with odd number can connect to the second bus through the corresponding battery switch group, and the battery with even number is the opposite. The anode of the battery with even number can connect to the second bus through the corresponding battery switch group, and the cathode of the battery with even number can connect to the first bus through the corresponding battery switch group. Therefore, direction switch array 22 controls the conduction of different direction switches, such that the anode of each battery can connect to positive output terminal o and the cathode of each battery can connect to the negative output terminal (e.g., reference ground GND).

Direction switch array 22 can include two groups of direction switches, the first group of direction switches can selectively connect the first or second bus to the positive pole of DC bus voltage VDC (e.g., positive output terminal o), and the second group of direction switches can selectively connect the first or second bus to the negative pole of DC bus voltage VDC (e.g., reference ground GND). Each group of direction switches can include two direction switches, so direction switch array 22 can include four direction switches (NMOS transistors here). In direction switch array 22, the two direction switches in the first group have the same direction, the first power ends of two direction switches in the first group can connect to positive output terminal o, and the second power ends of two direction switches in the first group may respectively be connected to the first bus and the second bus. The two direction switches in the second group may have the same direction, and the direction of the direction switch in the second group is opposite to that of the direction switch in the first group. The first power ends of the two direction switches in the second group may respectively be connected to the first and second buses, and the second power ends of the two direction switches in the second group are connected to the negative output terminal (e.g., reference ground GND).

For example, the first group of direction switches in direction switch array 22 can include direction switches S16 and S17, and the second group of direction switches in direction switch array 22 can include direction switches S18 and S19. The drain terminals (e.g., the first power ends) of direction switches S16 and S17 can connect to positive output terminal o, the source terminal (e.g., the second power end) of direction switch S16 can connect to the first bus, and the source terminal (e.g., the second power end) of direction switch S17 can connect to the second bus. The source terminals (e.g., the second power ends) of direction switches S18 and S19 can connect to reference ground GND, the drain terminal (e.g., the first power end) of direction switch S18 can connect to the first bus, and the drain terminal (e.g., the first power end) of direction switch S19 can connect to the second bus. It should be understood that in this particular example, both the battery switch and the direction switch are N-type MOSFET, and in other examples, the battery switch and the direction switch can also be other types of transistors, such as IGBT.

In this embodiment, the reference ground of driving circuit 3 of the switch array is the same as the reference ground of the output terminals of switching converter 1; that is, the negative pole (e.g., reference ground GND) of DC bus voltage VDC. Driving circuit 3 can include a plurality of sub-driving circuits, which are in one-to-one correspondence with the battery switch groups and the direction switches in switch array 2, thereby generating driving signals for each battery switch group and each direction switch in battery module n. That is, there are N+1 battery switch groups and 4 direction switches in battery module n, so there are N+5 sub-driving circuits, each sub-driving circuit is the same, and the reference ground of each sub-driving circuit is the same as that of driving circuit 3 of the switch array, which is reference ground GND, so all sub-driving circuits of the same battery module can be integrated into one chip.

It should be understood that only the control circuit corresponding to one battery module (e.g., battery module n) is shown in FIG. 3. For a plurality of battery modules connected in series, each battery module can be controlled by a corresponding control circuit. The control circuits corresponding to other battery modules may be the same as that of battery module n in FIG. 3. The control circuits corresponding to these battery modules may together form the battery control system.

Figure 4:
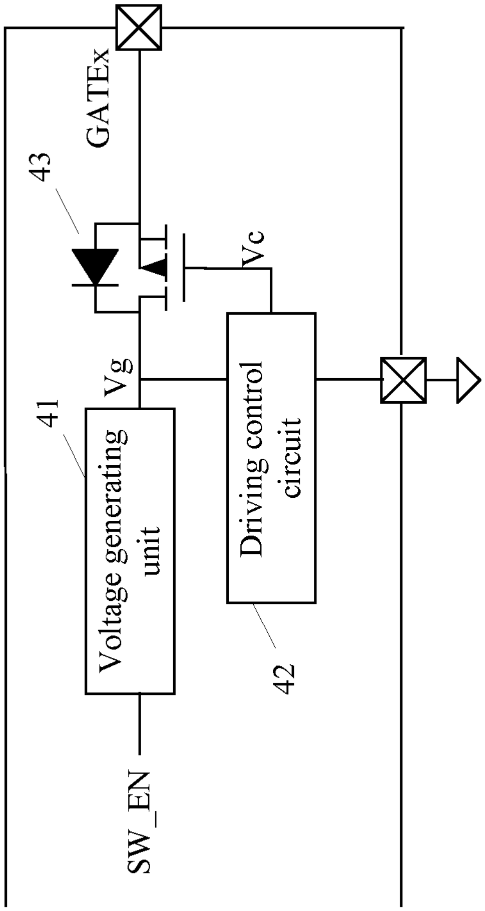
FIG. 4 is a schematic block diagram of an example sub-driving circuit, in accordance with embodiments of the present invention.

Referring now to FIG. 4, shown is a schematic block diagram of an example sub-driving circuit, in accordance with embodiments of the present invention. In this particular example, sub-driving circuit 4 can drive a battery switch group in the battery switch array or a direction switch in the direction switch array in battery module n. That is, each battery switch group and each direction switch may be driven by a corresponding sub-driving circuit. For example, sub-driving circuit 4 can include voltage generating unit 41, driving control circuit 42, and path switch 43. Voltage generating unit 41 can be controlled by an enable signal to generate and output driving voltage Vg. Driving control circuit 42 may receive driving voltage Vg to generate driving control signal Vc. The control terminal of path switch 43 may receive driving control signal Vc to be controlled to turn on or off, thus forming the charging path or the discharging path, such that the battery switch group or the direction switch is turned on or off. In this example, the first power end of path switch 43 can connect to the output terminal of voltage generating unit 41, and the second power end of path switch 43 can connect to output port GATEx of sub-driving circuit 4, where GATEx is a pin of the chip.

When path switch 43 is turned on, driving voltage Vg generated by voltage generating unit 41 can be transmitted to output port GATEx to be provided to the control end of the battery switch group or direction switch connected to output port GATEx, and a charging path may be formed to charge the internal capacitor of the battery switch or the direction switch to turn on the battery switch or the directional switch. Path switch 43 can include an anti-parallel diode connected in parallel with it. Similarly, the anti-parallel diode can be integrated inside path switch 43 or externally connected. When the switch in the switch array needs to be turned off, the capacitor inside the switch can be discharged through the corresponding anti-parallel diode of the path switch to turn off the switch, thus forming a discharge path. In this particular example, the path switch is a P-type MOSFET.

For example, when the switch (e.g., battery switch group or direction switch) driven by sub-driving circuit 4 needs to be turned on, enable signal SW_EN received by voltage generating unit 41 can be active, such that voltage generating unit 41 outputs driving voltage Vg (for example, Vg=12V). In addition, driving control circuit 42 may receive driving voltage Vg to activate driving control signal Vc, in order to control path switch 43 to be turned on. Further, driving voltage Vg can be output to output port GATEx through path switch 43, in order to control the battery switch group or direction switch connected to output port GATEx to be turned on. Similarly, when the switch (e.g., battery switch group or direction switch) driven by sub-driving circuit 4 needs to be turned off, enable signal SW_EN received by voltage generating unit 41 may be inactive, such that voltage generating unit 41 no longer outputs driving voltage Vg. In addition, the output voltage of voltage generating unit 41 can be very low (e.g., close to 0V), and driving control circuit 42 may deactivate driving control signal Vc, path switch 43 can be controlled to be turned off, such that the potential at output port GATEx is close to zero, and the battery switch group or direction switch connected to output port GATEx can be controlled to be turned off.

Figure 5:
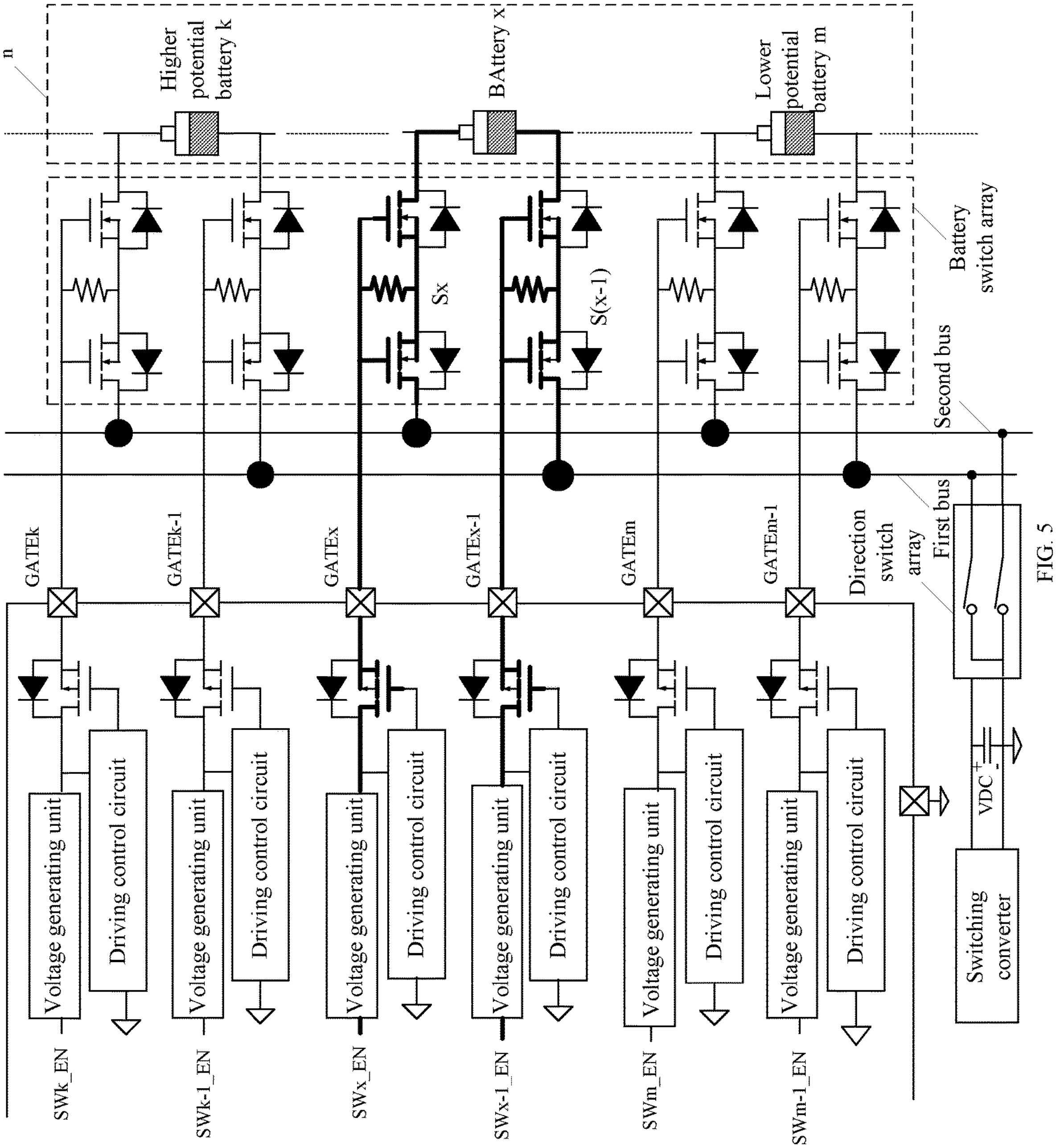
FIG. 5 is a schematic block diagram of an example drive principle of a battery switch array, in accordance with embodiments of the present invention.

Referring now to FIG. 5, shown is a schematic block diagram of an example drive principle of a battery switch array, in accordance with embodiments of the present invention. In this particular example, when battery x needs to be balanced, battery switch groups Sx and S(x−1) connected to the anode and cathode of battery x may need to be turned on. Therefore, the control circuit can control enable signals SWx_EN and SWx−1_EN of the sub-driving circuit to be active, such that the potentials at output ports GATEx and GATEx−1 are set to high level, and the capacitor between the gate terminal and source terminal of each battery switch in battery switch groups Sx and S(x−1) can be charged. Because the two battery switches connected in reverse series in each battery switch group can connect in common gate and common source, their gate-source voltages are the same. Therefore, when the gate-source voltages of battery switch groups Sx and S(x−1) both exceed the turn-on threshold, battery switch groups Sx and S(x−1) may be turned on to connect battery x between the first bus and the second bus. When x is an odd number, the anode of battery x can connect to the first bus and the cathode of battery x can connect to the second bus. Also, when battery x is an even number, the anode of battery x can connect to the second bus and the cathode of battery x can connect to the first bus.

When battery x does not need to be balanced, the control circuit can control enable signals SWx_EN and SWx−1_EN of the sub-driving circuit to be inactive, such that the potentials at output ports GATEx and GATEx−1 are zero. Thereafter, the capacitor between the gate terminal and source terminal of each battery switch in battery switch group Sx can be discharged through the anti-parallel diode of the path switch in the corresponding sub-driving circuit, so the gate-source voltage may be reduced. When the gate-source voltage is less than the turn-on threshold, battery switch group Sx can be turned off. Similarly, battery switch group S(x−1) may also be turned off.

Figure 6:
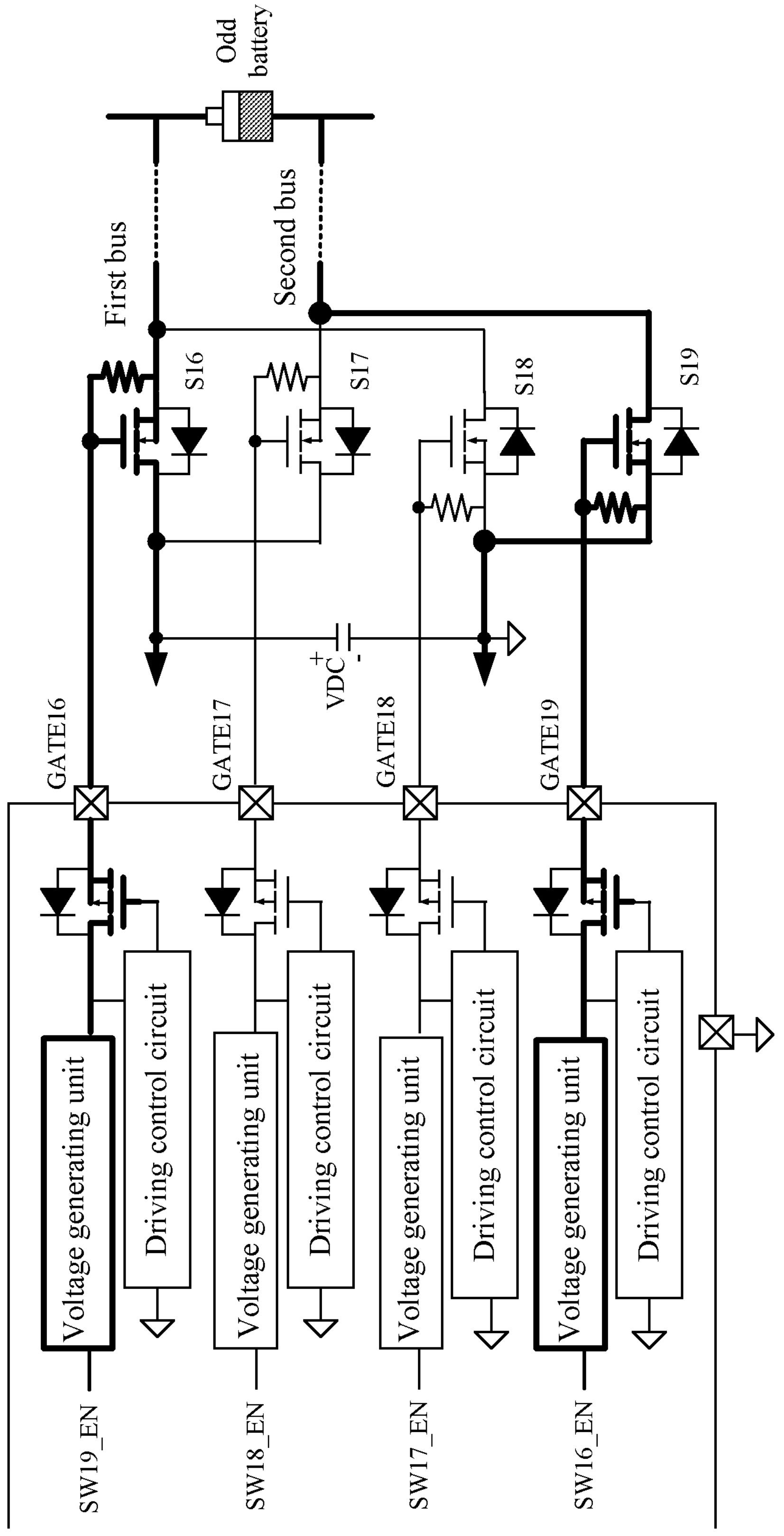
FIG. 6 is a schematic block diagram of a first example drive principle of a direction switch array, in accordance with embodiments of the present invention.

Referring now to FIG. 6, shown is a schematic block diagram of a first example drive principle of a direction switch array, in accordance with embodiments of the present invention. When an odd-numbered battery (hereinafter referred to as "odd battery") in the battery module needs to be balanced, the anode of the odd battery can be connected to the first bus through the battery switch group, and the cathode of the odd battery can be connected to the second bus through the battery switch group. So, it may be necessary to connect the first bus to positive output terminal o and the second bus to reference ground GND through the direction switch array, such that the odd battery can be correctly connected to the secondary output ports. Therefore, the sub-driving circuit can control the direction switch (e.g., S16) connected to the first bus in the first group of direction switches of the direction switch array and the direction switch (e.g., S19) connected to the second bus in the second group of direction switches of the direction switch array to be turned on.

For example, the control circuit can control enable signals SW16_EN and SW19_EN of the sub-driving circuit to be active, the potentials at output ports GATE16 and GATE19 are set to high level, and the capacitors between the gate terminal and the source terminal of direction switches S16 and S19 may be charged. When each gate-source voltage exceeds the turn-on threshold, direction switches S16 and S19 can be turned on, such that the first bus can connect to positive output terminal o of secondary side through direction switch S16, and the second bus can connect to reference ground GND through direction switch S19, such that the anode of the odd battery can connect to positive output terminal o, and the cathode of the odd battery can connect to reference ground GND.

When the odd battery does not need to be balanced, the control circuit can control enable signals SW16_EN and SW19_EN of the sub-driving circuit to be inactive, such that the potentials at output ports GATE16 and GATE19 are zero. Thereafter, the capacitor between the gate terminal and the source terminal of direction switch S16 may be discharged through the anti-parallel diode of the path switch in the corresponding sub-driving circuit, so the gate-source voltage is reduced. When the gate-source voltage is less than the turn-on threshold, direction switch S16 can be turned off. Similarly, direction switch S19 may also be turned off.

Figure 7:
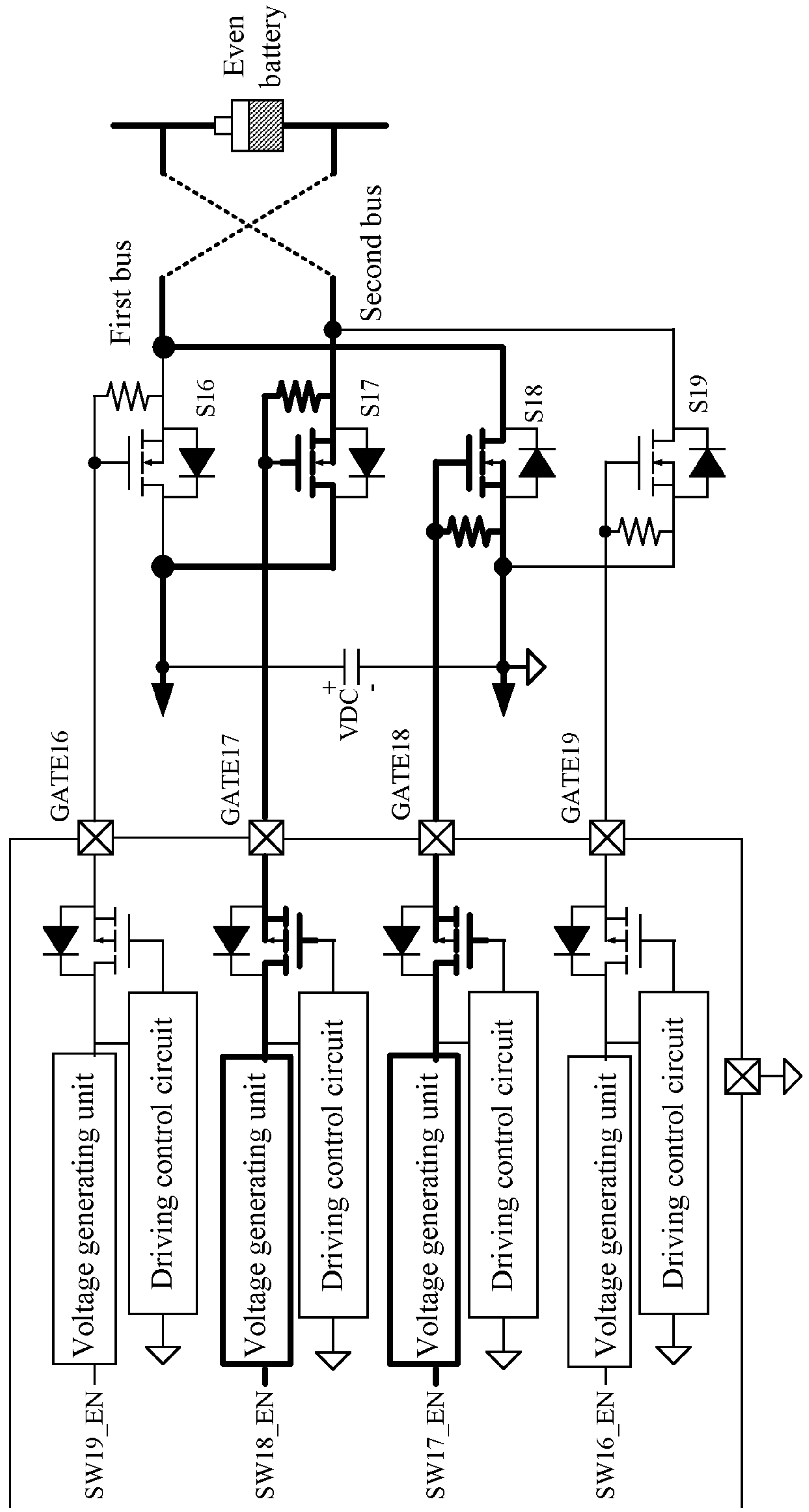
FIG. 7 is a schematic block diagram of a second example drive principle of a direction switch array, in accordance with embodiments of the present invention.

Referring now to FIG. 7, shown is a schematic block diagram of a second example drive principle of a direction switch array, in accordance with embodiments of the present invention. When an even-numbered battery (hereinafter referred to as "even battery") in the battery module need to be balanced, the anode of the even battery can be connected to the second bus through the battery switch group and the cathode of the even battery can be connected to the first bus through the battery switch group. So, it may be necessary to connect the second bus to positive output terminal o and the first bus to reference ground GND through the direction switch array, such that the even battery can be correctly connected to the secondary output ports. Therefore, the sub-driving circuit can control the direction switch (e.g., S17) connected to the second bus in the first group of direction switches of the direction switch array and the direction switch (e.g., S18) connected to the first bus in the second group of direction switches of the direction switch array to be turned on.

For example, the control circuit can control enable signals SW17_EN and SW18_EN of the sub-driving circuits to be active, the potentials at output ports GATE17 and GATE18 may be set to high level, and the capacitors between the gate terminal and source terminal of direction switches S17 and S18 can be charged. When the gate-source voltage exceeds the turn-on threshold, direction switches S17 and S18 may be turned on, such that the second bus can connect to positive output terminal o through direction switch S17, and the first bus can connect to reference ground GND through direction switch S18, so the anode of the even battery can connect to the positive output terminal o, and the cathode of the even battery can connect to reference ground GND.

When the even battery does not need to be balanced, the control circuit can control enable signals SW17_EN and SW18_EN of the sub-driving circuits to be inactive, such that the potentials at output ports GATE17 and GATE18 are zero. Thereafter, the capacitor between the gate terminal and the source terminal of direction switch S17 may be discharged through the anti-parallel diode of the path switch in the corresponding sub-driving circuit, so the gate-source voltage is reduced. When the gate-source voltage is less than the turn-on threshold, direction switch S17 can be turned off. Similarly, direction switch S18 may also be turned off.

Figure 8:
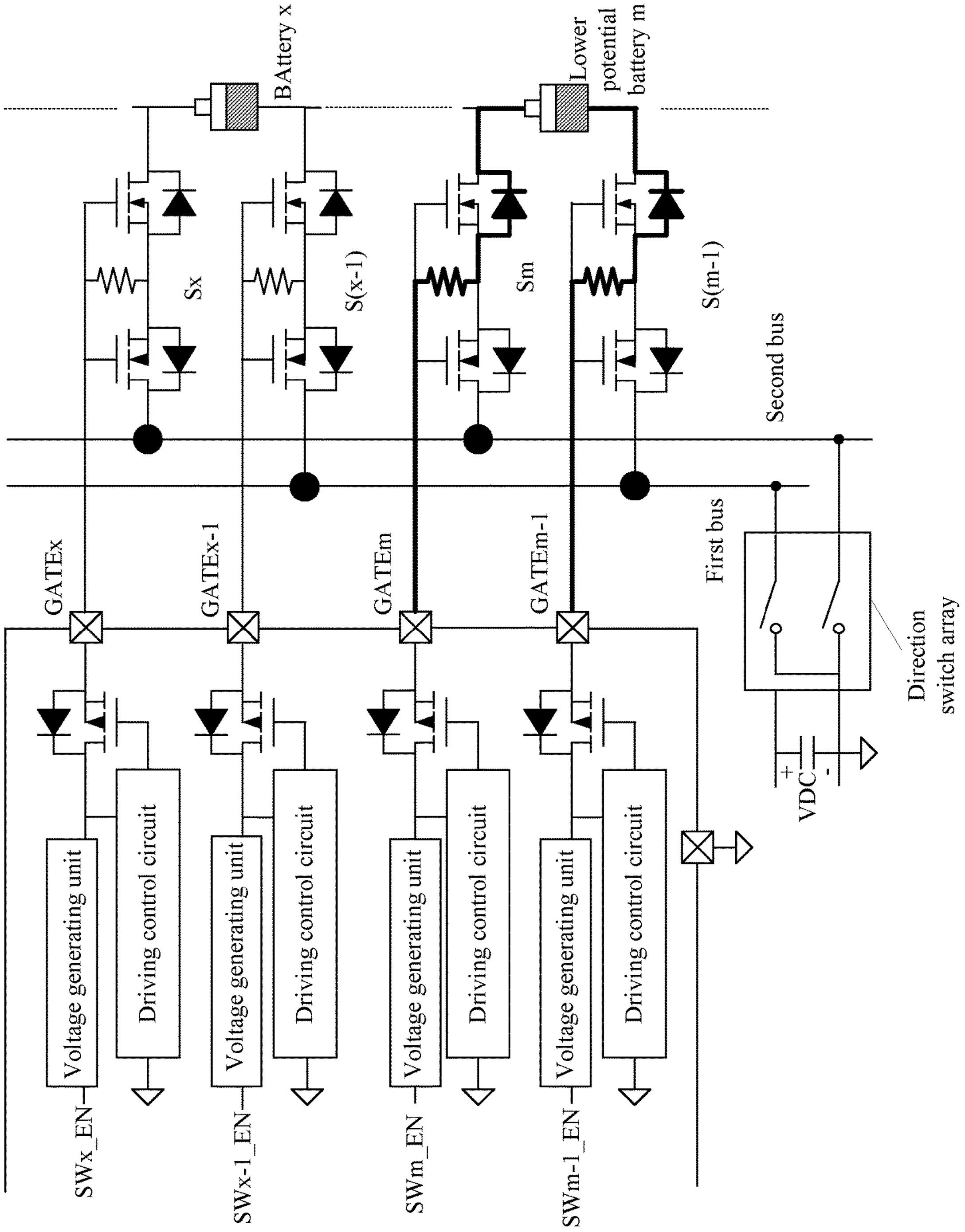
FIG. 8 is a schematic block diagram of an example negative voltage protection principle, in accordance with embodiments of the present invention.

Referring now to FIG. 8, shown is a schematic block diagram of an example negative voltage protection principle, in accordance with embodiments of the present invention. When battery x is selected to be balanced, the cathode of battery x can be connected to reference ground GND, and the first and second bus voltages can be clamped between 0 and the voltage of battery x. At this time, the voltages of the anode and the cathode of each other low-potential batteries (e.g., whose potential is lower than the potential of the cathode of battery x) that are not selected to be balanced may all be negative, and the cathode of the lowest-potential battery m may have the highest negative voltage in battery module n. In this particular example, the negative voltage reaches output ports GATEm−1 and GATEm through the reverse diodes of the second battery switches in battery switch group S(m−1) and Sm. Because the path switch in the sub-driving circuit is a P-type MOSFET, its gate voltage is 0, and then the negative voltage is blocked by the path switch in the sub-driving circuit, this can ensure that the high negative voltage does not affect normal operation of other parts in the chip. In addition, the negative voltage can be blocked by the first battery switch in the battery switch group, in order to avoid disturbing the first and second buses.

In particular embodiments, in a driving circuit of a switch array, the reference ground of the driving circuit of the switch array can be the negative pole of the secondary output filter capacitor of the switching converter, not the negative pole of the lowest-potential battery in the lowest-potential battery module. Also, the reference ground of the sub-driving circuit corresponding to each battery switch group and direction switch in the same battery module can be the same as that of the driving circuit, such that all sub-driving circuits of the same battery module can be integrated into one chip. The chip can include N+5 pins, where each pin is coupled between the path switch and the battery switch group or the direction switch, and the influence of the common-mode voltage of other low-potential battery modules is substantially eliminated, such that the withstand voltage design of the chip only needs to meet the voltage requirements of the corresponding battery module. That is, the withstand voltage value may not be less than the sum of all battery voltages in the battery module, thus simplifying the withstand voltage design.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A driving circuit of a switch array for controlling one of a plurality of battery modules coupled in series, wherein:
a) each battery module comprises a plurality of batteries coupled in series;
b) the driving circuit is configured to generate corresponding driving signals to control corresponding switches in the switch array, such that each battery that is selected to be balanced is coupled between positive and negative poles of a DC bus voltage; and
c) a reference ground of the driving circuit is configured as the negative pole of the DC bus voltage.

2. The driving circuit of claim 1, wherein:
a) the switch array comprises (N+1) battery switch groups and four direction switches, the driving circuit comprises (N+5) sub-driving circuits corresponding to each battery switch group and each direction switch;
b) each sub-driving circuit comprises a path switch controlled by a driving control signal to be turned on or off to form a charging path or a discharging path, such that the battery switch group or the direction switch is turned on or off; and c) N is a number of batteries in the battery module.

3. The driving circuit of claim 2, wherein a reference ground of each sub-driving circuit is the same as the reference ground of the driving circuit.

4. The driving circuit of claim 2, wherein all the sub-driving circuits are integrated in a chip, and the chip comprises N+5 pins, and each pin is coupled between the path switch and the battery switch group or the direction switch.

5. The driving circuit of claim 1, wherein the reference ground of the battery module is inconsistent with the negative pole of the DC bus voltage.

6. The driving circuit of claim 2, wherein each of the sub-driving circuits further comprises:

a) a voltage generating unit configured to be controlled by an enable signal to generate a driving voltage; and b) a driving control circuit configured to receive the driving voltage to generate the driving control signal.

7. The driving circuit of claim 6, wherein an output terminal of the voltage generating unit is coupled to a first power end of the path switch, and a second power end of the path switch is coupled to an output port of the sub-driving circuit.

8. The driving circuit of claim 6, wherein when the path switch is turned on, the driving voltage is transmitted to an output port of the sub-driving circuit through the path switch, in order to charge an internal capacitor of the battery switch group or the direction switch coupled with the output port to turn on the battery switch group or the direction switch.

9. The driving circuit of claim 2, wherein the path switch comprises an anti-parallel diode coupled in parallel with the path switch, and when the battery switch group or the direction switch needs to be turned off, an internal capacitor of the battery switch group or the direction switch is discharged through the anti-parallel diode to turn off the battery switch group or the direction switch.

10. The driving circuit of claim 6, wherein:

a) the voltage generating unit generates the driving voltage when the enable signal is active, such that the driving control circuit activates driving control signal to control the path switch to be turned on; and b) the voltage generating unit does not generate the driving voltage when the enable signal is inactive, such that the driving control circuit generates an inactive driving control signal to control the path switch to be turned off.

11. The driving circuit of claim 2, wherein the battery switch groups are configured to selectively couple the batteries in the battery module between a first bus and a second bus, wherein each battery switch group comprises two battery switches to block a bidirectional current when being turned off.

12. The driving circuit of claim 11, wherein:

a) an anode of each odd-numbered battery is coupled to the first bus through a corresponding battery switch group, and a cathode of each odd-numbered battery is coupled to the second bus through a corresponding battery switch group; and b) an anode of each even-numbered battery is coupled to the second bus through a corresponding battery switch group, and a cathode of each even-numbered battery is coupled to the first bus through a corresponding battery switch group.

13. The driving circuit of claim 2, wherein:

a) the four direction switches are divided into two groups;

b) each group of direction switches comprises two direction switches;

c) a first group of direction switches is configured to selectively couple a first bus or a second bus to the positive pole of the DC bus voltage; and d) a second group of direction switches is configured to selectively couple the first bus or the second bus to the negative pole of the DC bus voltage.

14. The driving circuit of claim 13, wherein:

a) two direction switches in the first group of direction switches have the same direction;

b) first power ends of the two direction switches in the first group of direction switches are both coupled to the positive pole of the DC bus voltage;

c) second power ends of the two direction switches in the first group of direction switches are respectively coupled to the first bus and the second bus;

d) two direction switches in the second group of direction switches have the same direction;

e) first power ends of the two direction switches in the second group of direction switches are respectively coupled to the first and second buses; and f) second power ends of the two direction switches in the second group of direction switches are both coupled to the negative pole of the DC bus voltage.

15. The driving circuit of claim 11, wherein each of the battery switch and the direction switch comprises an N-type MOSFET, and the path switch comprises a P-type MOSFET.

16. The driving circuit of claim 13, wherein:

a) when an odd-numbered battery in the battery module is selected to be balanced, the enable signals of the sub-driving circuits corresponding to two battery switch groups coupled with the anode and the cathode of the battery are controlled to be active, such that the anode of the battery is coupled to the first bus, and the cathode the battery is coupled to the second bus; and b) the enable signals of the sub-driving circuits corresponding to the direction switch coupled with the first bus in the first group of direction switches and the direction switch coupled with the second bus in the second group of direction switches are controlled to be active, such that the first bus is coupled to the positive pole of the DC bus voltage, and the second bus is coupled to the negative pole of the DC bus voltage.

17. The driving circuit of claim 13, wherein:

a) when an even-numbered battery in the battery module is selected to be balanced, the enable signals of the sub-driving circuits corresponding to two battery switch groups coupled with the anode and the cathode of the battery are controlled to be active, such that the anode of the battery is coupled to the second bus, and the cathode of the battery is coupled to the first bus; and b) the enable signals of the sub-driving circuits corresponding to the direction switch coupled to the second bus in the first group of direction switches and the direction switch coupled to the first bus in the second group of direction switches are controlled to be active, such that the second bus is coupled to the positive pole of the DC bus voltage, and the first bus is coupled to the negative pole of the DC bus voltage.

18. A control circuit, comprising the driving circuit of claim 1, and further comprising a switching converter configured to receive an input voltage to perform power conversion to generate the DC bus voltage at an output terminal of the switching converter thereof.

* * * * *